US008868240B2

(12) United States Patent
Seo (10) Patent No.: US 8,868,240 B2
(45) Date of Patent: Oct. 21, 2014

(54) WALKING ROBOT AND POSE CONTROL METHOD THEREOF

(75) Inventor: Kee Hong Seo, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 542 days.

(21) Appl. No.: 13/280,583

(22) Filed: Oct. 25, 2011

(65) Prior Publication Data

US 2012/0158181 A1 Jun. 21, 2012

(30) Foreign Application Priority Data

Dec. 21, 2010 (KR) ........................ 10-2010-0131262

(51) Int. Cl.
*G05B 15/00* (2006.01)
*B25J 9/16* (2006.01)
(52) U.S. Cl.
CPC .. *G05B 15/00* (2013.01); *B25J 9/16* (2013.01)
USPC ............ 700/261; 700/245; 700/254; 700/260
(58) Field of Classification Search
CPC ....... B62D 57/032; G05D 1/021; G05D 3/00; G05D 17/00; G05D 2201/0217
USPC .......................... 700/245, 260, 261, 262, 263
See application file for complete search history.

(56) References Cited

U.S. PATENT DOCUMENTS

| 7,313,463 | B2 * | 12/2007 | Herr et al. ...................... 700/245 |
| 7,400,939 | B2 * | 7/2008 | Nagasaka ...................... 700/245 |
| 8,060,253 | B2 * | 11/2011 | Goswami et al. ............. 700/250 |
| 8,340,817 | B2 * | 12/2012 | Honda et al. .................. 700/245 |
| 8,442,687 | B2 * | 5/2013 | Nagasaka ...................... 700/262 |
| 2008/0281469 | A1 * | 11/2008 | Choi et al. ...................... 700/253 |
| 2009/0321150 | A1 * | 12/2009 | Kwon et al. .................... 180/8.6 |
| 2010/0161117 | A1 * | 6/2010 | Kwak et al. .................... 700/245 |

* cited by examiner

*Primary Examiner* — Thomas G Black
*Assistant Examiner* — Peter D Nolan
(74) *Attorney, Agent, or Firm* — Staas & Halsey LLP (57) ABSTRACT

A walking robot, respective joints of which are operated through torque servo control to achieve stable pose control, and a pose control method thereof. A virtual acceleration of gravity is calculated using the COG of the robot and gravity compensation torques to apply force to links are calculated from the calculated acceleration of gravity so as to actively cope with external changes including external force or a tilt of the ground, thereby allowing the robot to stably maintain an erect pose and a desired upper body angle. Further, the robot maintains the erect pose with respect to the direction of gravity even under the condition that data regarding whether or not the ground is level or tilted are not given in advance, and maintains uniform poses of an upper body and legs while actively changing angles of ankle joints even if the ground is gradually tilted.

19 Claims, 6 Drawing Sheets

WALKING ROBOT AND POSE CONTROL METHOD THEREOF

CROSS-REFERENCE TO RELATED APPLICATIONS

This application claims the benefit of Korean Patent Application No. 2010-0131262, filed on Dec. 21, 2010 in the Korean Intellectual Property Office, the disclosure of which is incorporated herein by reference.

BACKGROUND

1. Field

Embodiments relate to a walking robot, respective joints of which are operated through torque servo control so as to achieve stable pose control, and a pose control method thereof.

2. Description of the Related Art

In general, research and development of walking robots which have a joint system similar to that of humans and coexist with humans in human working and living spaces is actively progressing. The walking robots are multi-legged walking robots having a plurality of legs, such as two or three legs or more. In order to achieve stable walking of the robot, actuators, such as electric motors or hydraulic motors, located at respective joints of the robot need to be driven. As a method to drive the actuators, there is a position-based Zero Moment Point (hereinafter, referred to as ZMP) control method in which command angles of respective joints, i.e., command positions, are given and the joints are controlled so as to track the command positions. As an additional method to drive the actuators, there is a torque-based Finite State Machine (hereinafter, referred to as FSM) control method in which command torques of respective joints are given and the joints are controlled so as to track the command torques.

In the ZMP control method, walking direction, walking stride, and walking velocity of a robot are set in advance so as to satisfy a ZMP constraint. For example, a ZMP constraint may be a condition that a ZMP is present in a safety region within a support polygon formed by supporting leg(s) (if the robot is supported by one leg, this means the region of the leg, and if the robot is supported by two legs, this means a region set to have a small area within a convex polygon including the regions of the two legs in consideration of safety). In the ZMP control method, walking patterns of the respective legs corresponding to the set factors are generated, and walking trajectories of the respective legs are calculated based on the walking patterns. Further, angles of joints of the respective legs are calculated through inverse kinematics of the calculated walking trajectories, and target control values of the respective joints are calculated based on current angles and target angles of the respective joints. Moreover, servo control allowing the respective legs to track the calculated walking trajectories per control time is carried out. That is, during walking of the robot, whether or not positions of the respective joints precisely track the walking trajectories according to the walking patterns is detected, and if it is detected that the respective legs deviate from the walking trajectories, torques of the motors are adjusted so that the respective legs precisely track the walking trajectories.

However, the ZMP control method is a position-based control method and thus achieves precise position control, but needs to perform precise angle control of the respective joints in order to control the ZMP and thus requires a high servo gain. Thereby, the ZMP control method requires high current and thus has low energy efficiency and high stiffness of the joints, thereby applying high impact to a surrounding environment. Further, the ZMP control method needs to avoid kinematic singularities in order to calculate angles of the respective joints, thereby causing the robot to take a pose with knees bent at all times during walking and thus to have an unnatural gait differing from that of a human.

SUMMARY

Therefore, it is an aspect of an embodiment to provide a walking robot in which an upper body angle is stably maintained so that the robot maintains an erect pose and is kept balanced even if external force is applied to the robot or a tilt of the ground is changed, and a pose control method thereof.

Additional aspects of embodiments will be set forth in part in the description which follows and, in part, will be obvious from the description, or may be learned by practice of embodiments.

In accordance with an aspect of an embodiment, a pose control method of a walking robot, which has an upper body, a pelvis link connected to the lower portion of the upper body, a plurality of hip joint units connected to the lower portion of the pelvis link, a plurality of legs respectively connected to the plurality of hip joint units and feet respectively provided at the plurality of legs, includes calculating a position of the current COG of the robot, calculating force, which needs to be compensated for to keep the robot balanced, by calculating an error between the calculated position of the current COG and a position of the target COG, converting the calculated compensation force into a virtual acceleration of gravity, measuring actual rotating angles of the pelvis link, calculating moment, which needs to be compensated for to keep the robot balanced, by calculating errors between the measured actual rotating angles and target rotating angles, and distributing the calculated compensation moment to the plurality of legs, calculating joint torques to control poses of the plurality of legs using the calculated compensation moment and the virtual acceleration of gravity, and performing torque servo control using the calculated joint torques.

The position of the target COG may be set to a position which is vertical to the ground from the center between the plurality of legs contacting the ground.

The position of the target COG may be set to a position which is vertical to the ground from an arbitrary point within the plurality of legs contacting the ground.

The distribution of the calculated compensation moment to the plurality of legs may include calculating a ratio of distances from a point, obtained by reflecting the COG of the robot in the ground, to the plurality of legs, and setting a leg closer to the point to have a greater value using the calculated ratio of the distances.

The calculation of the joint torques may include converting the compensation moment distributed to the plurality of legs into joint torques of the plurality of legs using a Jacobian matrix in which each foot of the robot is regarded as a base link.

The conversion of the calculated compensation force into the virtual acceleration of gravity may include calculating the virtual acceleration of gravity from the compensation force using Equation 3 below, assuming that a mass of the robot is defined as m and an acceleration of gravity of the earth is defined as g, $$g_f = f/m + g. \qquad \text{[Equation 3]}$$

The pose control method may further include calculating virtual gravity compensation torques necessary for respective joints of the plurality of legs using the virtual acceleration of gravity, and the calculation of the joint torques may include compensating for the gravity compensation torques by adding the calculated joint torques to the gravity compensation torques.

The virtual gravity compensation torques may be calculated from the virtual acceleration of gravity qf, angles q of all the joints of each leg, masses and positions of the COGs of all the links of each leg, and a mass and position of the COG of the upper body distributed to the plurality of legs.

The distribution of the mass of the upper body to the plurality of legs may include calculating a ratio of distances from a point, obtained by reflecting the COG of the robot in the ground, to the plurality of legs, and allotting a greater amount of the mass of the upper body to a leg closer to the point using the calculated ratio of the distances.

The calculation of the virtual gravity compensation torques necessary for the respective joints of the plurality of legs may include performing gravity compensation in consideration of a weight of the opposite leg according to a plurality of leg states.

The plurality of leg states may include an upper body support state and a swing state according to whether or not the feet respectively provided at the plurality of legs contact the ground.

The pose control method may further include calculating damping torques of the plurality of legs, and the calculation of the joint torques may include compensating for the calculated joint torques of the plurality of legs using the damping torques.

The measurement of the actual rotating angles of the pelvis link may include measuring rotating angles of the pelvis link in the yaw direction (rotated in the Z-axis), in the pitch direction (rotated in the Y-axis) and in the roll direction (rotated in the X-axis) with respect to a tilt of a torso using an IMU.

In accordance with another aspect of an embodiment, a walking robot, which has an upper body, a pelvis link connected to the lower portion of the upper body, a plurality of hip joint units connected to the lower portion of the pelvis link, a plurality of legs respectively connected to the plurality of hip joint units and feet respectively provided at the plurality of legs, includes a calculation unit to calculate a position of the current COG of the robot, a set unit to set a position of the target COG of the robot, a pose control unit to calculate force, which needs to be compensated for to keep the robot balanced, by calculating an error between the calculated position of the current COG and the set position of the target COG, to convert the calculated compensation force into a virtual acceleration of gravity, to calculate moment, which needs to be compensated for to keep the robot balanced, by calculating errors between actual rotating angles and target rotating angles of the pelvis link, and to calculate joint torques to control poses of the plurality of legs using the calculated compensation moment and the virtual acceleration of gravity, and a servo control unit to transmit the calculated joint torques to joints of the respective legs to perform torque servo control.

The pose control unit may calculate a ratio of distances from a point, obtained by reflecting the COG of the robot in the ground, to the plurality of legs and to distribute the calculated compensation moment to the plurality of legs using the calculated ratio of the distances so that a leg closer to the point has a greater value.

The walking robot may further include an IMU to measure the actual rotating angles of the pelvis link with respect to an inertial system, and the pose control unit may measure rotating angles of the pelvis link in the yaw direction (rotated in the Z-axis), in the pitch direction (rotated in the Y-axis) and in the roll direction (rotated in the X-axis) with respect to a tilt of a torso using the IMU.

The pose control unit may calculate virtual gravity compensation torques for the plurality of legs using the virtual acceleration of gravity and compensate for the calculated joint torques of the plurality of legs using the calculated gravity compensation torques.

The pose control unit may calculate damping torques of the plurality of legs and compensate for the joint torques of the plurality of legs using the damping torques.

BRIEF DESCRIPTION OF THE DRAWINGS

These and/or other aspects of embodiments will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout.

Figure 1:
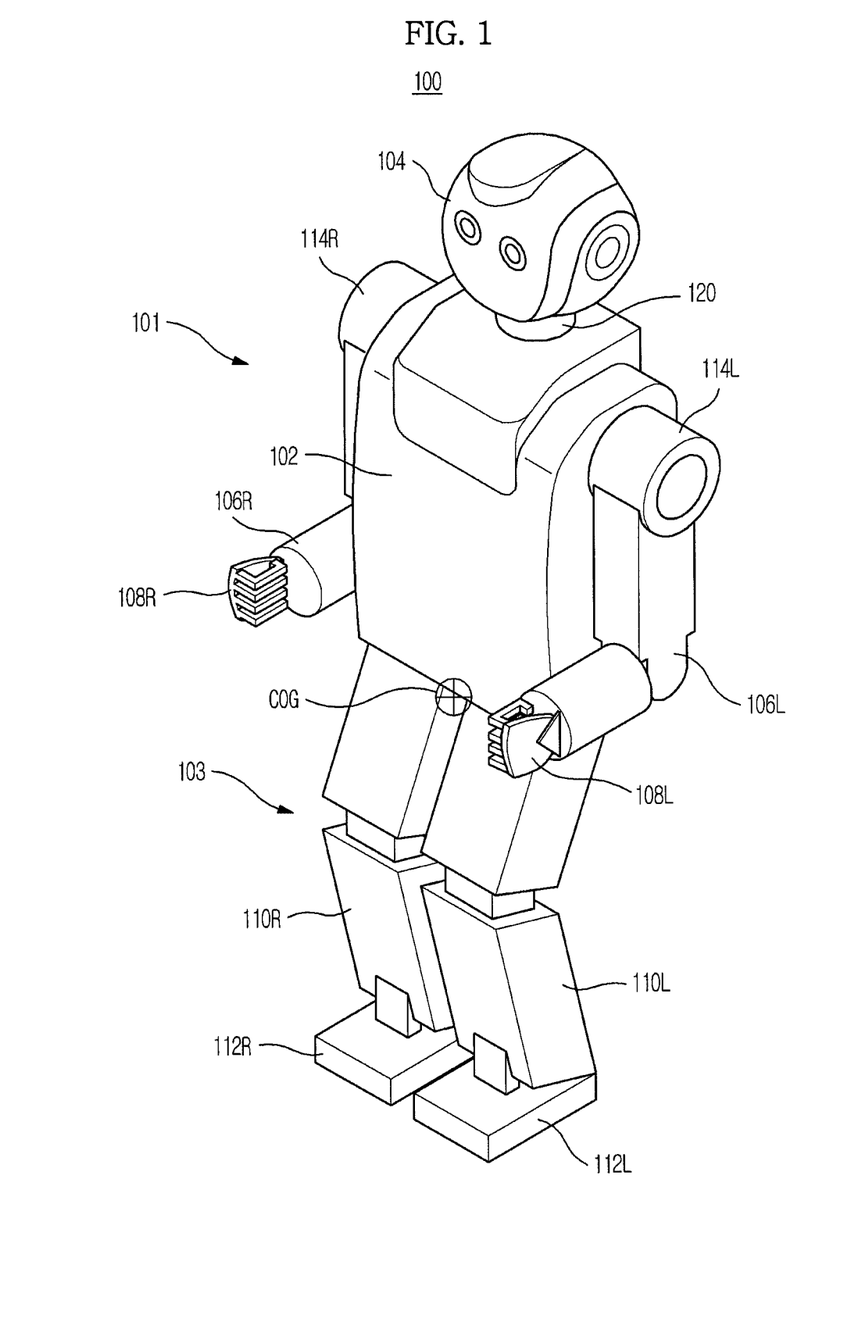
FIG. 1 is a view illustrating an external appearance of a walking robot in accordance with an embodiment.
Figure 2:
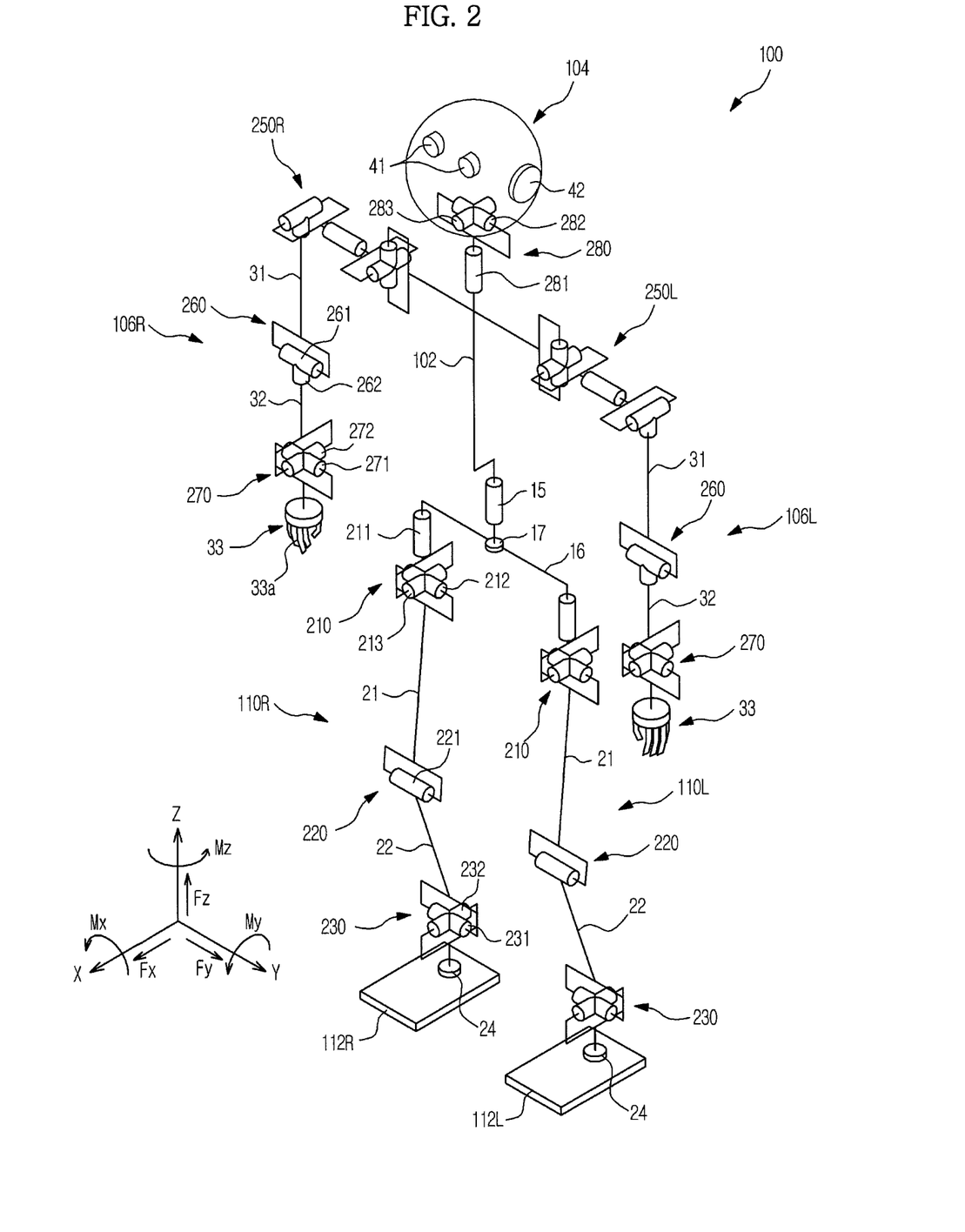
FIG. 2 is a view illustrating structures of main joints of the robot shown in FIG. 1.

FIG. 1 is a view illustrating an external appearance of a walking robot in accordance with an embodiment and FIG. 2 is a view illustrating structures of main joints of the robot shown in FIG. 1.

As shown in FIGS. 1 and 2, a robot 100 is a bipedal walking robot, which walks erect with two legs 110 in the same manner as a human, and includes an upper body 101 including a torso 102, a head 104 and arms 106R and 106L, and a lower body 103 including the two legs 110R and 110L.

The upper body 101 of the robot 100 includes the torso 102, the head 104 connected to the upper portion of the torso 102 through a neck 120, the two arms 106R and 106L connected to both sides of the upper portion of the torso 102 through shoulders 114R and 114L, and hands 108R and 108L respectively connected to tips of the two arms 106R and 106L.

A waist joint unit 15 having 1 degree of freedom in the yaw direction is installed on the torso 102 of the robot 100 so that the upper body 101 is rotatable about the waist joint unit 15.

The lower body 103 of the robot 100 includes a pelvis link 16 connected to the lower portion of the waist joint unit 15, the two legs 110R and 110L connected to both sides of the lower portion of the pelvis link 16, and feet 112R and 112L respectively connected to tips of the two legs 110R and 110L.

Here, "R" and "L" respectively indicate the right and left sides of the robot 100, and "COG" indicates the center of gravity of the robot 100.

Cameras 41 to capture surrounding images and microphones 42 to receive a user's voice are installed on the head 104 of the robot 100.

The head 104 is connected to the torso 102 of the upper body 101 through a neck joint unit 280. The neck joint unit 280 includes a rotary joint 281 in the yaw direction (rotated around the Z-axis), a rotary joint 282 in the pitch direction (rotated around the Y-axis) and a rotary joint 283 in the roll direction (rotated around the X-axis), and thus has 3 degrees of freedom.

Motors (for example, actuators such as electric motors and hydraulic motors) to rotate the head 104 are connected to the respective rotary joints 281, 282 and 283 of the neck joint unit 280.

The two arms 106R and 106L of the robot 100 respectively include upper arm links 31, lower arm links 32 and hands 33.

The upper arm links 31 of the two arms 106R and 106L are connected to the torso 101 through shoulder joint units 250R and 250L, the upper arm links 31 and the lower arm links 32 of the two arms 106R and 106L are connected to each other through elbow joint units 260, and the lower arm links 32 and the hands 33 of the two arms 106R and 106L are connected to each other through wrist joint units 270.

The shoulder joint units 250R and 250L are installed at both sides of the torso 102 of the upper body 101 and connect the two arms 106R and 106L to the torso 102 of the upper body 101.

Each elbow joint unit 260 includes a rotary joint 261 in the pitch direction and a rotary joint 262 in the yaw direction, and thus has 2 degrees of freedom.

Each wrist joint unit 270 includes a rotary joint 271 in the pitch direction and a rotary joint 272 in the roll direction, and thus has 2 degrees of freedom.

Each hand 33 is provided with five fingers 33a. A plurality of joints (not shown) driven by motors may be installed on the respective fingers 33a. The fingers 33a perform various motions, such as gripping of an article or pointing in a specific direction, in connection with movement of the arms 106R and 106L.

The pelvis link 16 having two hip joint units 210 is connected to the lower portion of the torso 102. The pelvis link 16 corresponds to the pelvis of a human and is connected to the torso 102 of the upper body 101 through the hip joint units 210. An Inertial Measurement Unit (IMU) 17 is installed on the pelvis link 16. The IMU 17 detects relative angles of the pelvis link 16 with respect to the direction of gravity and an inertial system and generates pose data in the roll direction, the pitch direction and the yaw direction.

The two legs 110R and 110L of the robot 100 respectively include thigh links 21, calf links 22 and the feet 112R and 112L.

The thigh links 21 of the two legs 110R and 110L correspond to the thighs of a human and are connected to the pelvis link 16 through the hip joint units 210, the thigh links 21 and the calf links 22 of the two legs 110R and 110L are connected to each other through knee joint units 220, and the calf links 22 and the feet 112R and 112L of the two legs 110R and 110L are connected to each other through ankle joint units 230.

Each hip joint unit 210 includes a rotary joint 211 in the yaw direction (rotated around the Z-axis), a rotary joint 212 in the pitch direction (rotated around the Y-axis) and a rotary joint 213 in the roll direction (rotated around the X-axis), and thus has 3 degrees of freedom.

Each knee joint unit 220 includes a rotary joint 221 in the pitch direction, and thus has 1 degree of freedom.

Each ankle joint unit 230 includes a rotary joint 231 in the pitch direction and a rotary joint 232 in the roll direction, and thus has 2 degrees of freedom.

Since 6 rotary joints of the hip joint units 210, the knee joint units 220 and the ankle joint units 230 are provided to each of the two legs 110R and 110L, a total of 12 rotary joints is provided to the two legs 110R and 110L.

Multi-Axis Force/Torque (F/T) sensors 24 are respectively installed between the feet 112R and 112L and the ankle joint units 230 of the two legs 110R and 110L. the F/T sensors 24 measure three directional components Fx, Fy, and Fz of force and three directional components Mx, My, and Mz of moment transmitted from the feet 112R and 112L, thereby detecting whether or not the feet 112R and 112L contact the ground or loads applied to the feet 112R and 112L.

Actuators, such as motors (not shown), to drive the respective rotary joints are provided on the robot 100. A pose control unit to control the overall operation of the robot 100 properly controls these motors, thereby achieving various motions of the robot 100.

The robot 100 calculates torque commands of the respective joints corresponding to control actions to perform the respective control actions, and outputs the calculated torque commands to the actuators, such as the motors, installed at the respective joints so as to drive the actuators.

In this embodiment, force and moment which need to be compensated for so as to keep the robot 100 balanced in real time are calculated using a position of the COG of the robot 100 and an angle of the pelvis link 16 in the inertial system. Then, a virtual acceleration of gravity is calculated from the calculated compensation force, and gravity compensation torques of the two legs 110R and 110L are calculated using the calculated virtual acceleration of gravity. Further, joint torques to control poses of the respective legs 110R and 110L are calculated by distributing the calculated moment to the two legs 110R and 110L. Therefore, torque servo control of the two legs 110R and 110L is performed using the calculated gravity compensation torques and joint torques. Thereby, the gravity compensation torques and the joint torques allow the upper body 101 to maintain a stable angle, thereby allowing the robot 100 to maintain an erect pose and to be kept balanced. Further, since a relative tilt of the robot with respect to the direction of gravity is detected by the IMU 17, although the ground is tilted in any direction, the upper body 101 and the legs 110R and 110L of the robot 100 may maintain uniform poses while actively controlling the torques of the hip joint units 210, the knee joint units 220 and the ankle joint units 230. This will be described in more detail with reference to FIG. 3.

Figure 3:
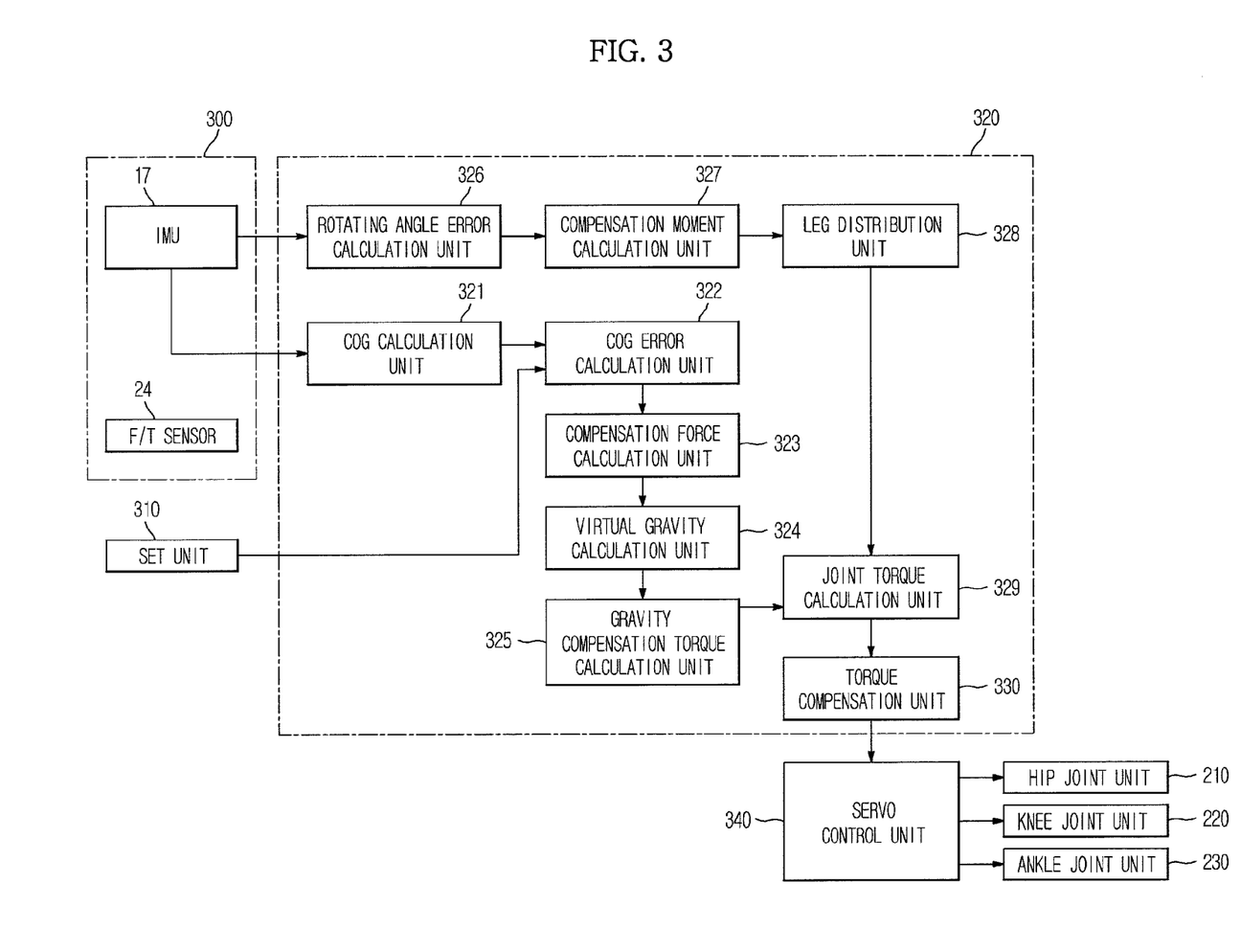
FIG. 3 is a block diagram of a pose control system of the walking robot in accordance with an embodiment.
Figure 4:
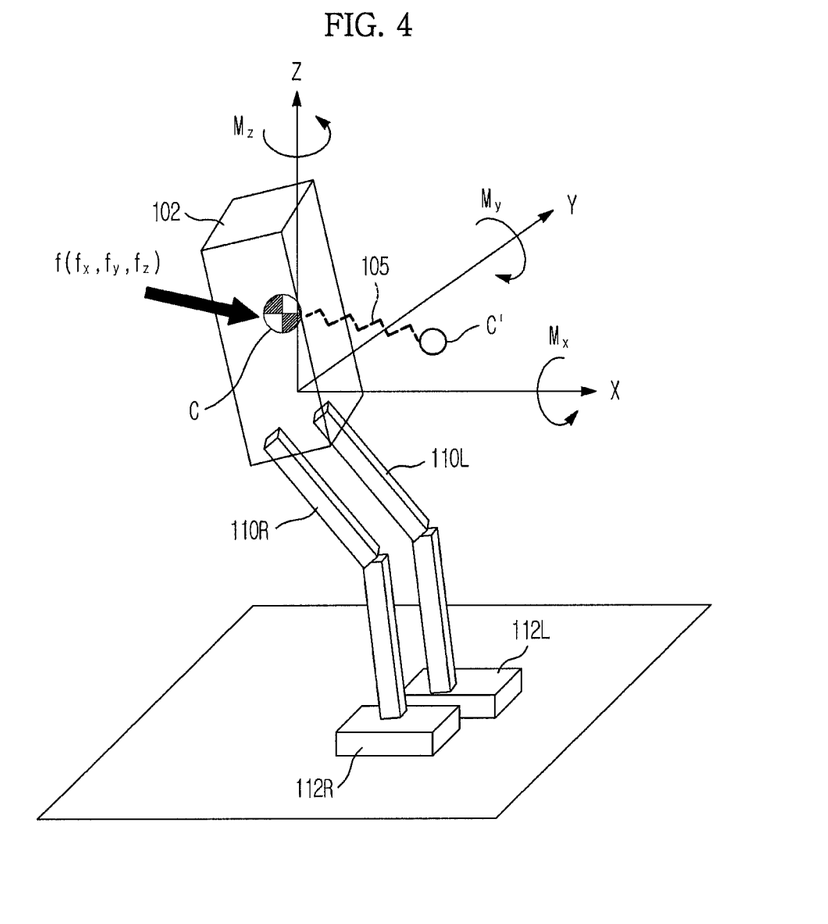
FIG. 4 is a perspective view illustrating a link configuration of the walking robot in accordance with an embodiment.
Figure 5:
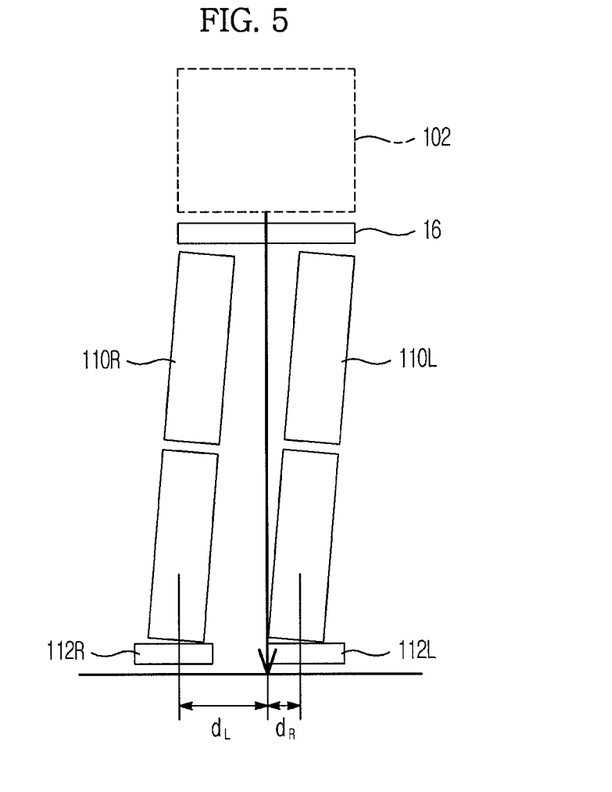
FIG. 5 is a front view illustrating the link configuration of the walking robot in accordance with an embodiment.

FIG. 3 is a block diagram of a pose control system of the walking robot in accordance with an embodiment, FIG. 4 is a perspective view illustrating a link configuration of the walking robot in accordance with an embodiment, and FIG. 5 is a front view illustrating the link configuration of the walking robot in accordance with an embodiment.

With reference to FIG. 3, the pose control system of the robot 100 in accordance with an embodiment includes a sensor unit 300, a set unit 310, a pose control unit 320 and a servo control unit 340.

The sensor unit 300 includes the IMU 17 to measure tilts and rotating angles of the pelvis link 16 in the roll direction, the pitch direction and the yaw direction and the F/T sensors 24 respectively installed between the feet 112R and 112L and the ankle joint units 230 of the robot 100 to detect whether or not the feet 112R and 112L contact the ground.

Here, instead of the IMU 17, a tilt detection sensor or a Gyro sensor may be used as a sensor to detect the pose of the upper body 101. Further, instead of the F/T sensors 24, contact sensors or other equivalent sensors may be used as a sensor to detect whether or not the feet 112R and 112L contact the ground.

The set unit 310 sets a position of the target COG C'(x, y, z) of the robot 100 to a position which is vertical to the ground from the center between the two feet 112R and 112L of the robot 100 contacting the ground, so that the robot 100 is kept balanced in real time while maintaining an erect pose. As shown in FIG. 5, the set unit 310 sets the position of the target COG C'(x, y, z) of the robot 100 corresponding to a state of the robot 100 so as to keep the robot 100 balanced.

The pose control unit 320 is a Proportional-Derivative (PD) controller or a Proportional-Integral-Derivative (PID) controller to control the pose of the robot 100 based on the target COG of the robot 100 set by the set unit 310 and the sensor data detected by the sensor unit 300. The pose control unit 320 includes a COG calculation unit 321, a COG error calculation unit 322, a compensation force calculation unit 323, a virtual gravity calculation unit 324, a gravity compensation torque calculation unit 325, a rotating angle error calculation unit 326, a compensation moment calculation unit 327, a leg distribution unit 328, a joint torque calculation unit 329 and an arithmetic and toque compensation unit 330.

The COG calculation unit 321 calculates a position of the current COG C(x, y, z) of the robot 100 by the IMU 17 and forward kinematics. The position of the current COG C(x, y, z) of the robot 100 is located on the torso 102, as shown in FIG. 5, and a direction of the current COG C(x, y, z) of the robot 100 complies with an orientation of the inertial system fixed to the direction of gravity.

The COG error calculation unit 322 calculates a COG error e between the calculated position of the current COG C(x, y, z) of the robot 100 and the set position of the target COG C'(x, y, z) of the robot 100 through Equation 1 below.

$$e = C' - C \quad \text{[Equation 1]}$$

The compensation force calculation unit 323, assuming that a virtual spring 105 (having a constant $k_p$) is present between the calculated position of the current COG C(x, y, z) and the set position of the target COG C'(x, y, z), calculates force f(fx, fy, fz) which needs to be compensated for so as to keep the robot 100 balanced, using the COG error e calculated by the COG error calculation unit 322, through Equation 2 below.

$$f = k_p e \quad \text{[Equation 2]}$$

The virtual gravity calculation unit 324 calculates a virtual acceleration of gravity $g_f$ from the compensation force f(fx, fy, fz) calculated using the COG error e through Equation 3 below.

$$g_f = f/m + g \quad \text{[Equation 3]}$$

In Equation 3, m is a mass of the robot 100 and g is an acceleration of gravity of the earth ((0, 0, −9.8)m/s$^2$).

The gravity compensation torque calculation unit 325 calculates torque G(q) for gravity compensation from the virtual acceleration of gravity $g_f$ calculated through Equation 3. Masses of the torso 102 and the pelvis link 16 used to calculate virtual gravity compensation torques of the two legs 110R and 110L are distributed to the right and left legs 110R and 110L, as follows. As shown in FIG. 5, using a ratio of a distance $d_L$ from a point, obtained by reflecting the COG of the robot 100 in the ground, to the left foot 112L to a distance $d_R$ from the point to the right foot 112R, a leg being closer to the point (for example, the left leg 110L) is set to have a greater value, through Equation 4 below.

$$w_L = \frac{d_R}{d_R + d_L} \quad \text{[Equation 4]}$$

$$w_R = 1 - w_L$$

The rotating angle error calculation unit 326 calculates errors $e_1$ between the rotating angles of the pelvis link 16 in the roll direction, the pitch direction and the yaw direction measured by the IMU 17 and target rotating angles.

The compensation moment calculation unit 327, assuming that virtual springs (having a constant $k_1$) are present on three axes in the roll direction, the pitch direction and the yaw direction of the pelvis link 16, calculates moment M(Mx, My, Mz), which needs to be compensated for so as to keep the robot 100 balanced, using the rotating angle errors $e_1$ calculated by the rotating angle error calculation unit 326 through Equation 5 below.

$$M = k_1 e_1 \quad \text{[Equation 5]}$$

The leg distribution unit 328 distributes the compensation moment M(Mx, My, Mz), calculated using the rotating angle errors $e_1$, to the two legs 110R and 110L through Equation 6 below.

$$M_{Left} = w_L M$$

$$M_{Right} = w_R M \quad \text{[Equation 6]}$$

$W_L$ and $W_R$ in Equation 6 are defined by Equation 4.

The joint torque calculation unit 329 respectively calculates joint torques τ of the two legs 110R and 110L for pose control from the compensation moment M, calculated by the compensation moment calculation unit 327, and the gravity compensation torque G(q), calculated by the gravity compensation torque calculation unit 325, through Equation 7 below.

$$\tau_{Left} = J^T \begin{bmatrix} 0 \\ M_{Left} \end{bmatrix} + G(q_{Left}) \quad \text{[Equation 7]}$$

$$\tau_{Right} = J^T \begin{bmatrix} 0 \\ M_{Right} \end{bmatrix} + G(q_{Right})$$

Here, J is a Jacobian matrix of positions of the COG of the robot 100 from the right and left legs 110R and 110L and is used to convert moment in a Cartesian space into joint torque.

In Equation 7, the gravity compensation torque G(q) is calculated from angles q of all the joints 210, 220 and 230 of each of the respective legs 110R and 110L, masses and positions of the COGs of all the links 21 and 22 of each of the respective legs 110R and 110L, and the total mass and position of the COG of the upper body 101. $q_{Left}$ means angles of all the joints 210, 220 and 230 of the left leg 110L and $q_{Right}$ means angles of all the joints 210, 220 and 230 of the right leg 110R. The joint torque $\tau_{Left}$ of the left leg 110L and the joint torque $\tau_{Right}$ of the right leg 110R are calculated by the same process, and thus are commonly referred to as $\tau_1$.

The torque compensation unit 330 calculates compensated a joint torque $\tau_2$ by adding damping torque dw (being proportional to velocity) to the joint torque $\tau_1$ of each of the respective joints 210, 220 and 230 so as to achieve passivity of a system to improve stability, through Equation 8 below.

$$\tau_2 = \tau_1 + dw \quad \text{[Equation 8]}$$

In Equation 8, d is a damping coefficient which is properly set, and w is a joint angular velocity which is measured.

The servo control unit 340 respectively provides the finally compensated joint torques $\tau_2$ to the hip joint units 210, the knee joint units 220 and the ankle joint units 230 of the two legs 110R and 110L, and thus outputs torque control signals corresponding to the compensated joint torques $\tau_2$ to the hip joint units 210, the knee joint units 220 and the ankle joint units 230 so as to drive the actuators, such as the motors, installed at the hip joint units 210, the knee joint units 220 and the ankle joint units 230.

When the hip joint units 210, the knee joint units 220 and the ankle joint units 230 receive the torque control signals from the servo control unit 340, the actuators, such as the motors, installed at the hip joint units 210, the knee joint units 220 and the ankle joint units 230 are driven. Thereby, although the ground is tilted, the robot 100 may be kept balanced in real time while maintaining an erect pose.

Hereinafter, the above-described walking robot, a pose control method thereof and an operating process, functions and effects thereof will be described.

Figure 6:
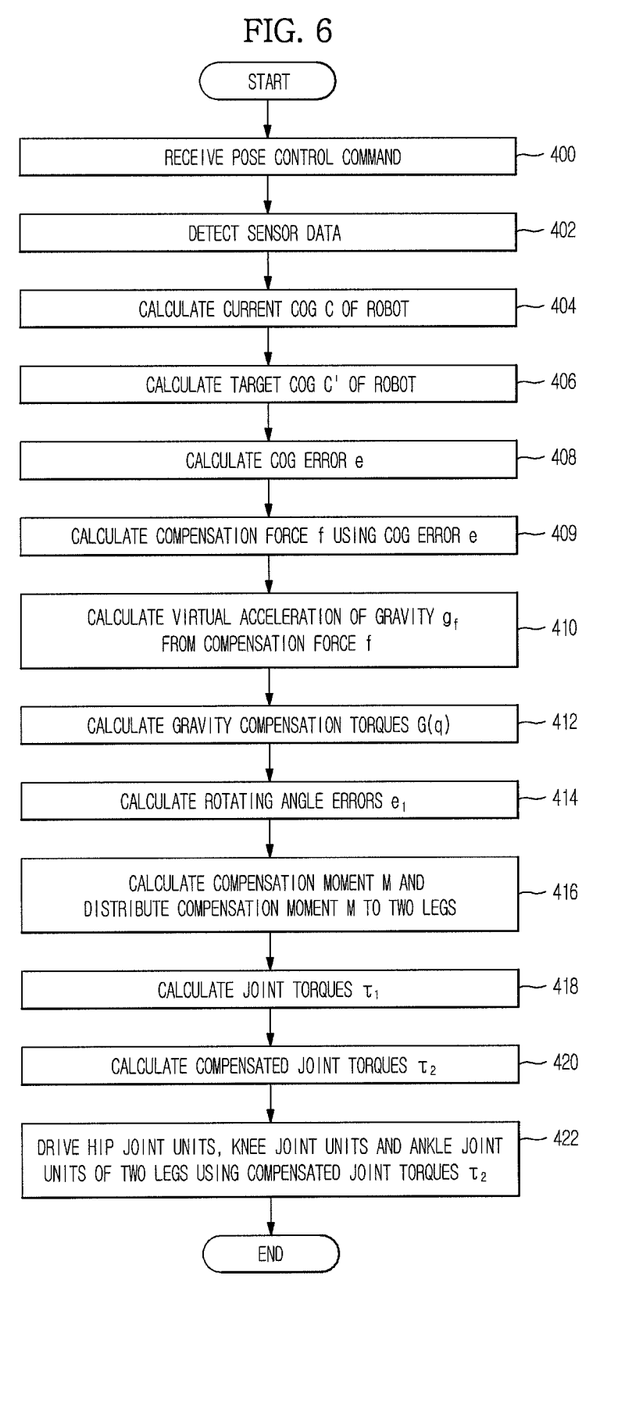
FIG. 6 is a flow chart illustrating a pose control method of the walking robot in accordance with an embodiment.

FIG. 6 is a flow chart illustrating the pose control method of the walking robot in accordance with an embodiment.

With reference to FIG. 6, the robot 100 receives a user command to instruct the robot 100 to control a pose through a user interface (Operation 400).

When the robot 100 receives the command for pose control, the IMU 17 installed on the pelvis link 16 of the robot 100 measures a tilt and a direction of the upper body 101 including the pelvis link 16 and the torso 102 through rotating angles of the upper body 101 in the roll direction, the pitch direction and the yaw direction with respect to the inertial system, and transmits the measured data to the COG calculation unit 321 of the pose control unit 320 (Operation 402).

Thereafter, the COG calculation unit 321 calculates a position of the current COG C(x, y, z) of the robot 100 by the IMU 17 and forward kinematics, and transmits the calculated position of the current COG C(x, y, z) of the robot 100 to the COG error calculation unit 322 (Operation 404).

Thereafter, the set unit 310 sets a position of the target COG C'(x, y, z) of the robot 100 to a position which is vertical to the ground from the center between the two feet 112R and 112L of the robot 100 contacting the ground, and transmits the set position of the target COG C'(x, y, z) of the robot 100 to the COG error calculation unit 322 (Operation 406).

Thereafter, the COG error calculation unit 322 calculates a COG error e between the calculated position of the current COG C(x, y, z) of the robot 100 and the set position of the target COG C'(x, y, z) of the robot 100 through Equation 1 below, and transmits the calculated COG error e to the compensation force calculation unit 323 (Operation 408).

$$e = C' - C \qquad \text{[Equation 1]}$$

The compensation force calculation unit 323 calculates force f(fx, fy, fz) which needs to be compensated for so as to keep the robot 100 balanced, using the COG error e calculated by the COG error calculation unit 322, through Equation 2 below, and transmits the calculated force f(fx, fy, fz) to the virtual gravity calculation unit 324 (Operation 409).

$$f = k_p e \qquad \text{[Equation 2]}$$

Thereafter, the virtual gravity calculation unit 324 calculates a virtual acceleration of gravity $g_f$ from the compensation force f(fx, fy, fz) calculated using the COG error e through Equation 3 below, and transmits the calculated virtual acceleration of gravity $g_f$ to the gravity compensation torque calculation unit 325 (Operation 410).

$$g_f = f/m + g \qquad \text{[Equation 3]}$$

In Equation 3, m is a mass of the robot 100 and g is an acceleration of gravity of the earth ((0, 0, −9.8)m/s²).

The gravity compensation torque calculation unit 325 calculates torque G(q) for gravity compensation from the virtual acceleration of gravity $g_f$ calculated through Equation 3, and transmits the calculated torque G(q) to the joint torque calculation unit 329 (Operation 412). Masses of the torso 102 and the pelvis link 16 used to calculate virtual gravity compensation torques of the two legs 110R and 110L are distributed to the right and left legs 110R and 110L, as follows. As shown in FIG. 5, using a ratio of a distance $d_L$ from a point, obtained by reflecting the COG of the robot 100 in the ground, to the left foot 112L to a distance $d_R$ from the point to the right foot 112R, a leg being closer to the point (for example, the left leg 110L) is set to have a greater value, through Equation 4 below.

$$w_L = \frac{d_R}{d_R + d_L} \qquad \text{[Equation 4]}$$

$$w_R = 1 - w_L$$

The concept of the virtual acceleration of gravity $g_f$ calculated through Equation 3 is as follows. The acceleration of gravity g of the earth is (0, 0, −9.8)m/s² in the X-Y-Z coordinate system, and an equation to compensate for gravity is used to calculate joint torques applied to the respective links, specifically all the links 21 and 22 of the respective legs 110R and 110L to exhibit force corresponding to the acceleration of gravity g of the earth. Here, if the acceleration of gravity g of the earth used in the equation to compensate for gravity is replaced with another value g', for example, if an expression of g'=2g is satisfied, force still remains even after compensation for gravity of the earth and thus force to accelerate all the links 21 and 22 of the respective legs 110R and 110L upwards is applied to the respective joints, specifically all the joints 210, 220 and 230 of the respective legs 110R and 110L. On the other hand, for example, if an expression of g'=g+(−3, 0, 0) is satisfied, force still remaining even after compensation for gravity of the earth acts as if gravity having a magnitude of 3 is applied in the X direction and thus accelerates the links, specifically all the links 21 and 22 of the respective legs 110R and 110L in the X direction. When the virtual acceleration of gravity $g_f$ is used as described above, torques to apply force to the links, specifically all the links 21 and 22 of the respective legs 110R and 110L in an arbitrary direction in the X-Y-Z coordinate system may be calculated in addition to compensation for gravity of the earth.

Such a compensation method using virtual gravity is carried out assuming that force is applied to the respective links, specifically all the links 21 and 22 of the respective legs 110R and 110L, thus being advantageous in that weights of all the links 21 and 22 of the respective legs 110R and 110L are considered.

The rotating angle error calculation unit 326 calculates errors $e_1$ between the rotating angles of the pelvis link 16 in the roll direction, the pitch direction and the yaw direction measured by the IMU 17 and target rotating angles, and transmits the errors $e_1$ to the compensation moment calculation unit 327 (Operation 414).

The compensation moment calculation unit 327 calculates moment M(Mx, My, Mz), which needs to be compensated for so as to keep the robot 100 balanced, using the rotating angle errors $e_1$ calculated by the rotating angle error calculation unit 326 through Equation 5 below, and transmits the calculated moment M(Mx, My, Mz) to the leg distribution unit 324.

$$M = k_1 e_1 \quad \text{[Equation 5]}$$

Thereafter, the leg distribution unit 328 distributes the compensation moment M(Mx, My, Mz), calculated using the rotating angle errors $e_1$, to the two legs 110R and 110L through Equation 6 below (Operation 416).

$$M_{Left} = w_L M$$

$$M_{Right} = w_R M \quad \text{[Equation 6]}$$

$W_L$ and $W_R$ Equation 6 defined by Equation 4.

Thereafter, the joint torque calculation unit 329 calculates joint torques τ of the two legs 110R and 110L for pose control from the compensation moment M, calculated by the compensation moment calculation unit 327, and the gravity compensation torque G(q), calculated by the gravity compensation torque calculation unit 325, through Equation 7 below, and transmits the calculated joint torques to the torque compensation unit 330 (Operation 418).

$$\tau_{Left} = J^T \begin{bmatrix} 0 \\ M_{Left} \end{bmatrix} + G(q_{Left}) \quad \text{[Equation 7]}$$

$$\tau_{Right} = J^T \begin{bmatrix} 0 \\ M_{Right} \end{bmatrix} + G(q_{Right})$$

In Equation 7, a joint torque τ is a 6-vector.

In Equation 7, J is a 6-by-6 Jacobian matrix, assuming that the foot 112 is regarded as a base link of the robot 100 and the COG is regarded as an end effector existing on the pelvis link 16. The Jacobian matrix is a matrix which may convert a velocity in a joint space into a velocity in a working space, and is induced from forward kinematics. The Jacobian matrix is used to convert moment in a Cartesian space into joint torque.

In Equation 7, the gravity compensation torque G(q) is calculated from angles q of all the joints 210, 220 and 230 of each of the respective legs 110R and 110L, masses and positions of the COGs of all the links 21 and 22 of each of the respective legs 110R and 110L, and the total mass and position of the COG of the upper body 101. $q_{Left}$ means angles of all the joints 210, 220 and 230 of the left leg 110L and $q_{Right}$ means angles of all the joints 210, 220 and 230 of the right leg 110R. The joint torque $\tau_{Left}$ of the left leg 110L and the joint torque $\tau_{Right}$ of the right leg 110R are calculated by the same process, and thus are commonly referred to as $\tau_1$.

Thereafter, the torque compensation unit 330 calculates a compensated joint torque $\tau_2$ by adding damping torque dw (being proportional to velocity) to the joint torque $\tau_1$ of each of the respective joints 210, 220 and 230 so as to achieve passivity of a system to improve stability, through Equation 8 below (Operation 420).

$$\tau_2 = \tau_1 + dw \quad \text{[Equation 8]}$$

In Equation 8, d is a damping coefficient and w is a joint angular velocity.

Thereafter, the servo control unit 340 respectively provides the finally compensated joint torques $\tau_2$ to the hip joint units 210, the knee joint units 220 and the ankle joint units 230 of the two legs 110R and 110L, and thus outputs torque control signals corresponding to the compensated joint torques $\tau_2$ to the hip joint units 210, the knee joint units 220 and the ankle joint units 230 so as to drive the actuators, such as the motors, installed at the hip joint units 210, the knee joint units 220 and the ankle joint units 230 (Operation 422). Thereby, although the ground is tilted, the robot 100 may be kept balanced in real time while maintaining an erect pose.

Therefore, although the ground is not level, the robot 100 may be kept balanced even if the robot 100 moves slowly or rapidly.

Further, since the robot 100 is kept balanced using the joints of the two legs 110R and 110L supporting the torso 102 although the ground is tilted, the pose control method is simple and may thus be applied to a robot having 6 degrees of freedom.

As is apparent from the above description, in a walking robot and a pose control method thereof in accordance with an embodiment, a virtual acceleration of gravity is calculated using the COG of the robot and gravity compensation torques to apply force to links are calculated from the calculated acceleration of gravity so as to actively cope with external changes including force applied from the outside or a tilt of the ground, thereby allowing the robot to stably maintain an erect pose and a desired upper body angle.

Further, the robot maintains the erect pose with respect to the direction of gravity of the earth even under the condition that data regarding whether or not the ground is level or tilted are not given in advance, and maintains uniform poses of an upper body and legs while actively changing angles of ankle joints even if the ground is gradually tilted.

Further, the robot maintains a pose in which the COG of the robot is located at the center of the feet when the poses of the upper body and the legs are maintained, and takes a pose in which one foot supports the ground when the COG is set to the foot. Further, a pose in which the COG is located at the front portions or the rear portions of the feet is achieved in the same manner. Such a change in poses may be carried out in real time.

Further, if a target height (a Z component) of the COG of the robot is decreased, joint torques of hips, knees and ankles are changed and thus joint angles are changed. Thereby, the upper body may be lowered to the target height in real time.

Further, if all target rotating angles of a pelvis link of the robot (in the roll direction, the pitch direction and the yaw direction) are set to zero, the robot takes an erect pose, and if all the target rotating angles of the pelvis link are set to other values, the robot takes a bending pose in an arbitrary direction. Particularly, if the target rotating angle of the robot in the yaw direction is changed, the robot takes a pose in which the torso is twisted with respect to the vertical axis. Such a change may be carried out in real time.

Further, if external force is applied to the robot, the robot withstands the force at stiffness corresponding to a defined spring constant, and if the force is continuously applied to the robot, the front portions or the rear portions of the feet of the robot leave the ground. However, even in this case, the robot may still perform the balancing function. Consequently, the pose control method in accordance with an embodiment allows the robot to withstand increased force without falling, as compared with conventional methods.

The embodiments can be implemented in computing hardware and/or software, such as (in a non-limiting example) any computer that can store, retrieve, process and/or output data and/or communicate with other computers. For example, the pose control unit 320 in FIG. 3 may include a computer to perform operations and/or calculations described herein. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A pose control method of a walking robot, which has an upper body, a pelvis link connected to a lower portion of the upper body, hip joint units connected to a lower portion of the pelvis link, legs respectively connected to the hip joint units and feet respectively provided at the legs, comprising:
    calculating a position of a current center of gravity (COG) of the robot;
    calculating force, which needs to be compensated for to keep the robot balanced, by calculating an error between the calculated position of the current COG and a position of a target COG;
    converting the calculated force into a virtual acceleration of gravity;
    measuring actual rotating angles of the pelvis link;
    calculating moment, which needs to be compensated for to keep the robot balanced, by calculating errors between the measured actual rotating angles and target rotating angles, and distributing the calculated moment to the legs;
    calculating joint torques to control poses of the legs using the calculated moment and the virtual acceleration of gravity; and
    performing torque servo control to control joints of the robot using the calculated joint torques.

2. The pose control method according to claim 1, wherein the position of the target COG is set to a position which is vertical to the ground from a center between the legs contacting the ground.

3. The pose control method according to claim 1, wherein the position of the target COG is set to a position which is vertical to the ground from an arbitrary point within the legs contacting the ground.

4. The pose control method according to claim 1, wherein said distributing the calculated moment to the legs includes:
    calculating a ratio of distances from a point, obtained by reflecting the current COG of the robot in the ground, to the legs; and
    setting a leg closer to the point to have a greater value using the calculated ratio of the distances.

5. The pose control method according to claim 4, wherein said calculating joint torques includes converting the calculated moment distributed to the legs into joint torques of the legs using a Jacobian matrix in which each foot of the robot is regarded as a base link.

6. The pose control method according to claim 5, wherein said converting the calculated force includes calculating the virtual acceleration of gravity from the calculated force using the following equation, assuming that a mass of the robot is defined as m and an acceleration of gravity of the earth is defined as g:

$$g_f = f/m + g.$$

7. The pose control method according to claim 6, further comprising:
    calculating virtual gravity compensation torques necessary for respective joints of the legs using the virtual acceleration of gravity,
    wherein said calculating joint torques includes compensating for the calculated virtual gravity compensation torques by adding the calculated joint torques to the calculated virtual gravity compensation torques.

8. The pose control method according to claim 7, wherein said calculating virtual gravity compensation torques calculates the virtual gravity compensation torques from the virtual acceleration of gravity $q_f$, angles q of all the joints of each leg, masses and positions of the COGs of all the links of each leg, and a mass and position of the COG of the upper body distributed to the legs.

9. The pose control method according to claim 8, further comprising:
    calculating a ratio of distances from a point, obtained by reflecting the current COG of the robot in the ground, to the legs; and
    allotting a greater amount of the mass of the upper body to a leg closer to the point using the calculated ratio of the distances.

10. The pose control method according to claim 7, wherein said calculating virtual gravity compensation torques includes performing gravity compensation in consideration of a weight of an opposite leg according to leg states.

11. The pose control method according to claim 10, wherein the leg states include an upper body support state and a swing state according to whether or not the feet respectively provided at the legs contact the ground.

12. The pose control method according to claim 7, further comprising calculating damping torques of the legs,
    wherein said calculating joint torques includes compensating for the calculated joint torques using the calculated damping torques.

13. The pose control method according to claim 1, wherein said measuring actual rotating angles of the pelvis link includes measuring rotating angles of the pelvis link in the yaw direction (rotated in the Z-axis), in the pitch direction (rotated in the Y-axis) and in the roll direction (rotated in the X-axis) with respect to a tilt of a torso using an IMU.

14. A walking robot, which has an upper body, a pelvis link connected to a lower portion of the upper body, hip joint units connected to a lower portion of the pelvis link, legs respectively connected to the hip joint units and feet respectively provided at the legs, the walking robot comprising:
    a calculation unit to calculate a position of a current COG of the robot;
    a set unit to set a position of a target COG of the robot;
    a pose control unit to calculate force, which needs to be compensated for to keep the robot balanced, by calculating an error between the calculated position of the current COG and the set position of the target COG, to convert the calculated force into a virtual acceleration of gravity, to calculate moment, which needs to be compensated for to keep the robot balanced, by calculating errors between actual rotating angles and target rotating angles of the pelvis link, and to calculate joint torques to control poses of the legs using the calculated moment and the virtual acceleration of gravity; and
    a servo control unit to transmit the calculated joint torques to joints of the respective legs to perform torque servo control.

15. The walking robot according to claim 14, wherein the pose control unit calculates a ratio of distances from a point, obtained by reflecting the current COG of the robot in the ground, to the legs and to distribute the calculated moment to the legs using the calculated ratio of the distances so that a leg closer to the point has a greater value.

16. The walking robot according to claim 14, further comprising an IMU to measure the actual rotating angles of the pelvis link with respect to an inertial system,
wherein the pose control unit measures rotating angles of the pelvis link in the yaw direction (rotated in the Z-axis), in the pitch direction (rotated in the Y-axis) and in the roll direction (rotated in the X-axis) with respect to a tilt of a torso using the IMU.

17. The walking robot according to claim 14, wherein the pose control unit calculates virtual gravity compensation torques for the legs using the virtual acceleration of gravity and compensates for the calculated joint torques using the calculated gravity compensation torques.

18. The walking robot according to claim 17, wherein the pose control unit calculates damping torques of the legs and compensates for the joint torques using the calculated damping torques.

19. A method comprising:
calculating a position of a current center of gravity (COG) of a walking robot;
calculating force, which needs to be compensated for to keep the robot balanced, by calculating an error between the calculated position of the current COG and a position of a target COG;
converting the calculated force into a virtual acceleration of gravity;
measuring actual rotating angles of a pelvis link of the robot;
calculating moment, which needs to be compensated for to keep the robot balanced, by calculating errors between the measured actual rotating angles and target rotating angles, and distributing the calculated moment to legs of the robot;
calculating joint torques to control poses of the legs using the calculated moment and the virtual acceleration of gravity; and
performing torque servo control to control joints of the robot using the calculated joint torques.

* * * * *